(12) United States Patent
Kurata

(10) Patent No.: US 6,226,119 B1
(45) Date of Patent: *May 1, 2001

(54) HIGH-MAGNIFICATION OBJECTIVE OPTICAL SYSTEM FOR BINOCULAR STEREOMICROSCOPES

(75) Inventor: Kiyonobu Kurata, Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,776

(22) Filed: Sep. 18, 1998

(30) Foreign Application Priority Data

Sep. 19, 1997 (JP) .................................................. 9-255443

(51) Int. Cl.$^7$ .................................................. G02B 21/00
(52) U.S. Cl. .......................... 359/380; 359/376; 359/368; 359/656
(58) Field of Search .................................. 359/368, 369, 359/381, 656–661, 380, 379, 371, 372, 376–378

(56) References Cited

U.S. PATENT DOCUMENTS 5,532,879 * 7/1996 Hayashi ................................ 359/661
5,638,207 * 6/1997 Fukuzawa et al. ................... 359/375
5,701,196 * 12/1997 Nakamura ............................ 359/362

FOREIGN PATENT DOCUMENTS 7-104190   4/1995  (JP) .
7-140393   6/1995  (JP) .
7-230040   8/1995  (JP) .

* cited by examiner

Primary Examiner—Darren Schuberg
Assistant Examiner—Fayez G. Assaf
(74) Attorney, Agent, or Firm—Pillsbury Winthrop LLP

(57) ABSTRACT

A high-magnification objective optical system for binocular stereomicroscopes, each having two observation optical systems for forming light from an object into left and right images through an objective lens, is provided with an optical member placed to be removable or replaceable between the object to be observed and the objective lens and satisfies the following condition:

$$0.2 < |NA \cdot m| < 1.2$$

where NA is a numerical aperture on an object side of the objective lens and m is the magnification of the objective lens. In this way, a stereoscopic observation is obtained, holding good performance of image formation at high magnification and NA.

14 Claims, 13 Drawing Sheets

0.5 x             1 x             2 x

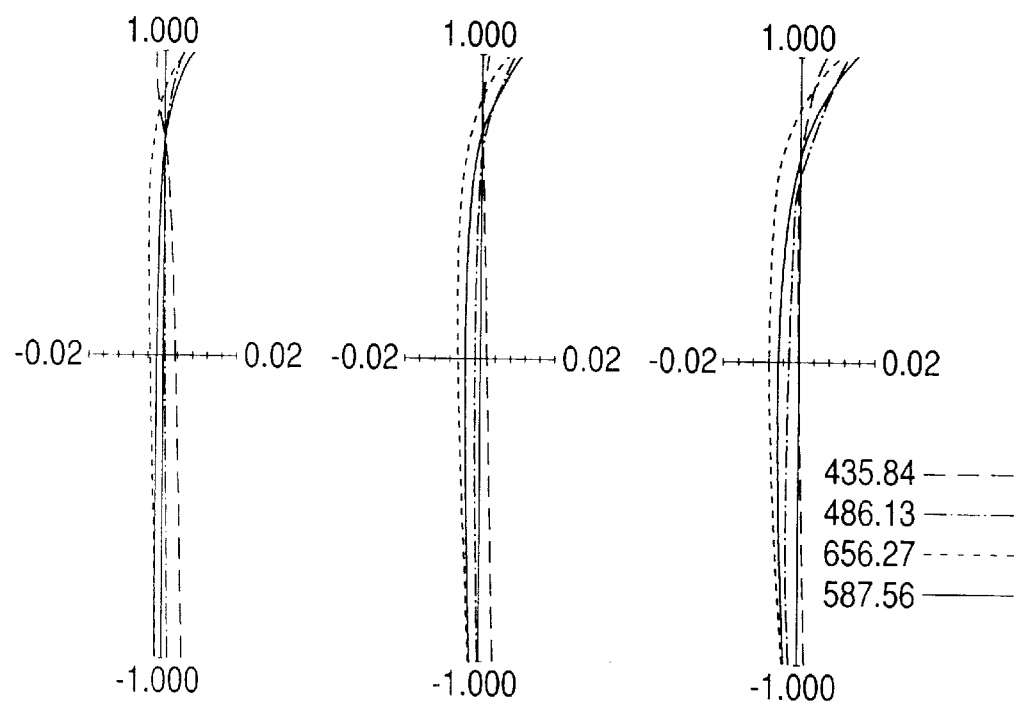

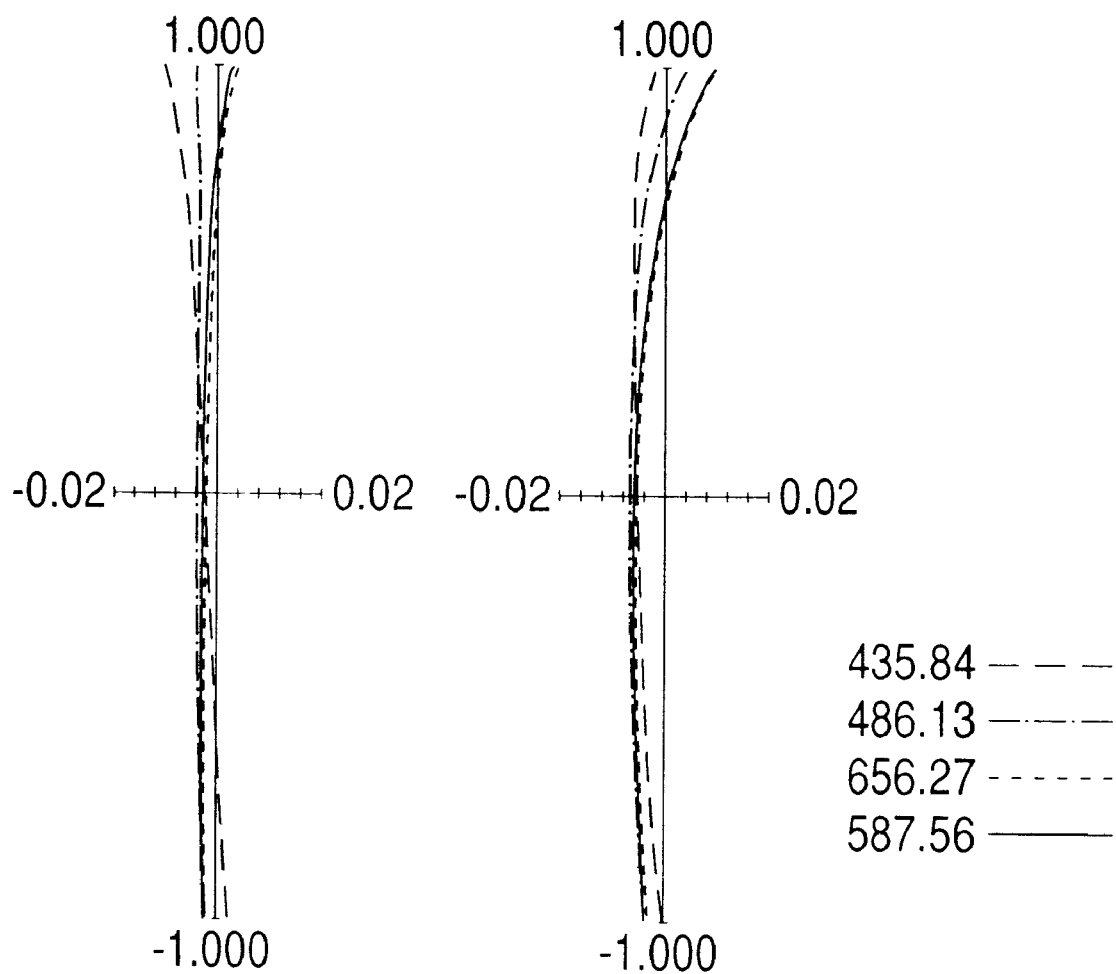

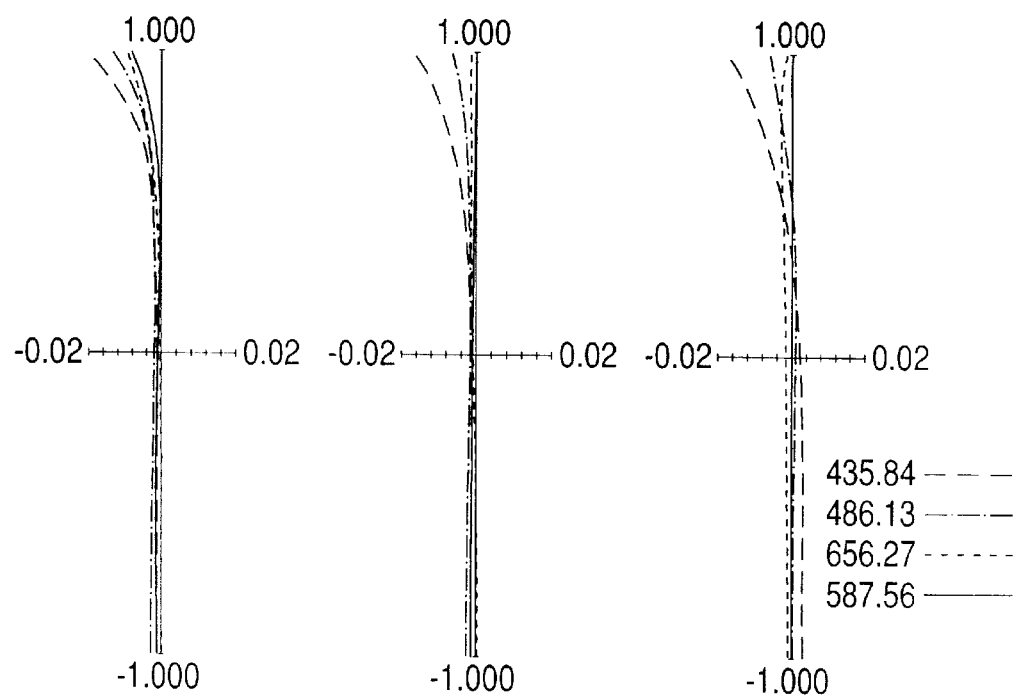

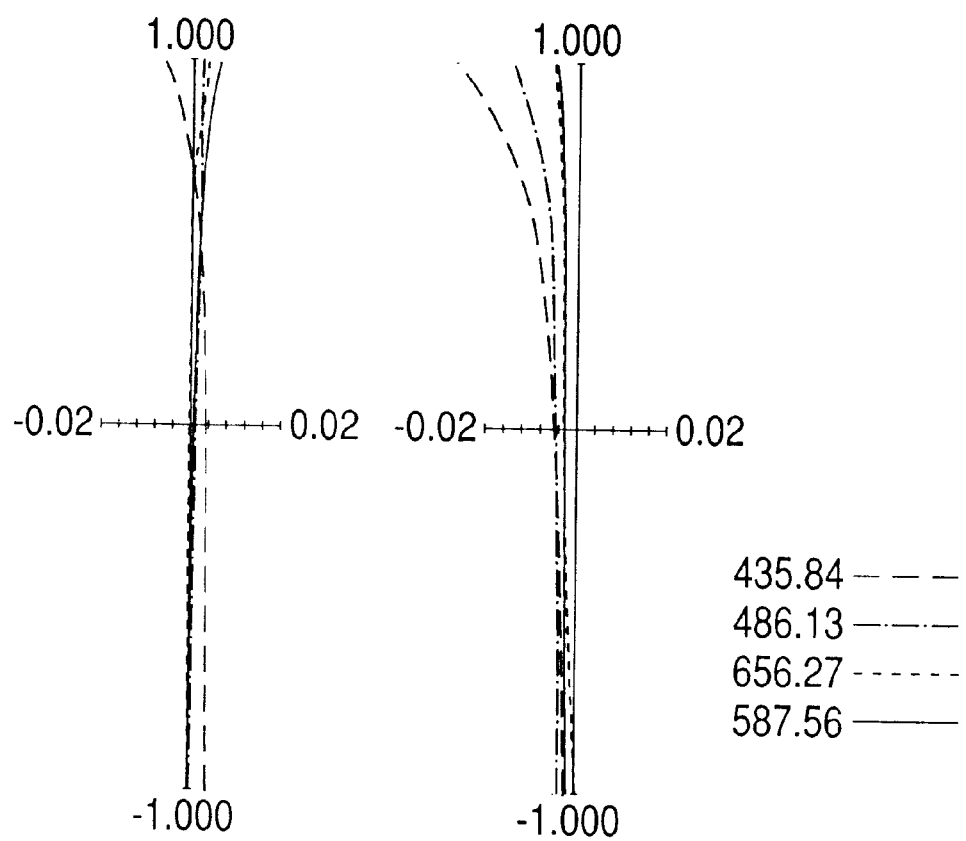

HIGH-MAGNIFICATION OBJECTIVE OPTICAL SYSTEM FOR BINOCULAR STEREOMICROSCOPES

BACKGROUND OF THE INVENTION

1. Field of the Invention

This invention relates to a high-magnification objective optical system for use in a binocular stereomicroscope equipped with two observation optical systems for forming light from an object into left and right images through an objective lens.

2. Description of Related Art

Stereomicroscopes are available in Greenough and Galilean (single objective) types. As an example of these types, a single objective type binocular stereomicroscope which is suitable for the purpose of obtaining a relatively high zoom ratio will be explained below.

A fundamental arrangement of an optical system in the single objective type binocular stereomicroscope is shown in FIG. 1. In this figure, the optical system comprises, in order from the side of an object 1, an objective lens 2, a focal zoom lenses 3 and 3', imaging lenses 4 and 4', and eyepieces 5 and 5'. Two optical axes corresponding to the eyes meet on the surface of a specimen, and an angle θ made by the two optical axes is called an internal inclination angle. Also, in FIG. 1, reference numerals 6 and 6' represent intermediate image positions. Here, primed and unprimed numerals in each pair indicate identical optical members.

As mentioned above, the single objective type binocular stereomicroscope, unlike an ordinary microscope, has two optical paths for the eyes, symmetrically located in the objective lens 2 with respect to its center, to see the object 1 from left and right sides. The object 1 can thus be viewed stereoscopically as in the case where observation is made with the unaided eye.

Moreover, since the single objective type binocular stereomicroscope is constructed so that the two optical paths are parallel between the objective lens 2 and the afocal zoom lenses 3 and 3' and between the afocal zoom lenses 3 and 3' and the imaging lenses 4 and 4', it is possible to replace the objective lens 2 or interpose, for example, an illumination optical system between the afocal zoom lenses 3 and 3' and the imaging lenses 4 and 4'. Hence, this stereomicroscope has the advantage of accommodating various observations.

The magnification of the objective lens in the single objective type binocular stereomicroscope is represented by the ratio between the focal lengths of the objective lens and the imaging lens. For example, if each of the focal lengths of the objective lens and the imaging lens is 100 mm, the magnification of the objective lens is 1×. This magnification is low compared with the case of the ordinary microscope. Specifically, objective lenses for ordinary microscopes range in magnification from 1 to 250×, whereas those for single objective type binocular stereomicroscopes range from 0.5 to 2×, and from 0.3 to 15× even when variable magnification optical systems are placed therein. In this way, the single objective type binocular stereomicroscope is chiefly used for general work because it has a lower magnification and a smaller numerical aperture (hereinafter referred to as NA) and therefore has a greater depth of focus and longer in working distance.

Since a change of magnification in the single objective type binocular stereomicroscope is mainly carried out by a variable magnification optical system located on the image side of the objective lens, the diameter and position of the exit pupil of the objective lens are changed, and the NA and a real field of view are also changed. In the case of a 1× objective lens, the NA and the real field of view undergo changes in the range from about 0.01 and 32 mm in diameter to about 0.1 and 6 mm in diameter, respectively. Such changes are illustrated in FIGS. 2A and 2B. FIG. 2A shows the case where the NA is high and the real field of view is small, and FIG. 2B shows the case where the NA is lower and the real field of view is larger. Also, in these figures, reference numeral 7 denotes the surface of a specimen (an object to be observed), 8 denotes an objective lens, and 9 denotes the exit pupil of the objective lens 8.

As stated above, in the single objective type binocular stereomicroscope, the change of magnification is often made by the variable magnification optical system. Where the specimen is observed at a higher or lower magnification, it is only necessary to replace the objective lens because of the structural feature of the single objective type binocular stereomicroscope. By doing so, in an ordinary case, magnifications of 0.75× and 0.5× are obtained at the low magnification side and magnifications of 1.5× and 2× at the high magnification side.

Although, in the above description, the single objective type binocular stereomicroscope has been specifically explained by way of example, a Greenough type stereomicroscope may be thought of as substantially the same as the single objective type binocular stereomicroscope with the exception that objective lenses are separately placed for the eyes.

In recent years, demands on observations with high magnification and NA have increased to make an assembly and profile inspection of electronic circuit parts in the industrial field and to sort out medium cells and oval cells in the field of biology. Thus, in the stereomicroscope, various attempts are made to bring the high magnification and NA to the variable magnification optical system and the objective lens. For the binocular stereomicroscope characterized by stereoscopic observation, however, it is necessary to solve the following problems in order to obtain the high magnification and NA.

Since most of specimens used in the industrial field are usually opaque to light, it is common practice to perform observations with a reflecting illumination system. In this case, light emitted from a light source passes through an illumination system, a variable magnification optical system, and an objective lens to irradiate a specimen. As a result, it is known that the light is reflected by lens surfaces of the variable magnification optical system and the objective lens, and thus deterioration in contrast is brought about. Hence, in coaxial reflecting illumination, a means such as that shown in FIG. 3 has been used to prevent the deterioration of contrast.

Specifically, light emitted from light sources 10 and 10' passes through polarizers 11 and 11' to change into linearly polarized light, which is reflected by half mirrors (or prisms) 12 and 12' and travels through afocal zoom lenses (variable magnification optical systems) 13 and 13' and an objective lens 14. Since a quarter-wave plate (or a λ/4 plate) 15 is placed in front of the objective lens 14, the light passing through the quarter-wave plate 15 is converted into circularly polarized light to irradiate a specimen surface 16. The circularly polarized light, when reflected by the specimen surface 16, rotates in a reverse direction. Thus, when this reflected light passes through the quarter-wave plate 15 again, it rotates by 90°, compared with the linearly polarized light which is initially incident. The quarter-wave plate 15 is transparent to only the light from the specimen surface 16 to prevent a reduction in contrast. In this way, the light having passed through the quarter-wave plate 15 is introduced through the afocal zoom lenses 13 and 13' and analyzers 17 and 17' into eyepieces 18 and 18'.

Thus, in the case of the coaxial reflecting illumination, a quarter-wave plate with a thickness of about 4–6 mm is placed in front of the objective lens, and thereby the deterioration of contrast has been prevented. Even though the magnification and the NA are increased by the variable magnification optical system, the placement of the quarter-wave plate does not so adversely affect the performance of image formation if the magnification of the objective lens is approximately 1×. Where the magnification is further increased to make observation, however, as mentioned above, it is necessary to replace the objective lens with that of higher magnification. In this way, if the magnification and the NA are increased, aberration attributable to the thickness of the quarter-wave plate will be produced. This gives rise to the problem of degrading the performance of image formation. Consequently, where the quarter-wave plate is used and observation is made by means of the coaxial reflecting illumination, the magnification of the objective lens has been limited to 1.5×.

On the other hand, specimens used in the field of biology are sometimes observed through water in vessels. The thickness (depth) of water in this case is usually about 1–10 mm. When observation is made under such circumstances, little problem arises in observation with low magnification. However, when observation is made at high magnification and NA in order to view an intracellular structure of a very small object such as an oval cell, the performance of image formation is degraded due to the thickness of water, and an image to be observed is blurred in spite of the fact that the magnification is increased by the objective lens of high magnification. This causes the problem that desired performance is not obtained.

Furthermore, the objective lens for binocular stereomicroscopes is designed so that axes of two optical paths lying at a predetermined distance apart are obliquely directed toward the specimen for image formation. As such, the single objective type binocular stereomicroscope has the following defects because two optical axes in the objective lens are located away from the center of the objective lens. FIGS. 4A, 4B, and 4C show cases where objective lenses have different magnifications of 0.5×, 1×, and 2×, respectively. As seen from these figures, the internal inclination angle θ increases with increasing magnification of an objective lens 20, and the optical axes between a specimen surface 19 and the objective lens 20 are inclined increasingly. Thus, there is the problem that as the magnification of the objective lens 20 is increased, the production of aberration becomes pronounced. Also, in these figures, reference numerals 21 and 21' represent afocal zoom lenses (variable magnification optical systems) and 22 and 22' represent eyepieces.

As has been mentioned, when the objective lens for binocular stereomicroscopes is designed to have a high magnification, various problems are raised. Since, in particular, the conventional stereomicroscope has been designed on the premise that only air is interposed between the specimen and the objective lens, it is an unquestionable fact that if media of different refractive indices are interposed therebetween, a resolving power cannot be improved for observation even when the objective lens of high magnification is used.

SUMMARY OF THE INVENTION

It is, therefore, an object of the present invention to provide a high-magnification objective optical system for binocular stereomicroscopes in which even though a medium having a certain refractive index is interposed between the specimen and the objective lens for stereomicroscopes, the performance of image formation is not degraded and a good stereoscopic image can be obtained when observation is made at high magnification and NA.

In order to achieve this object, according to the present invention, the high-magnification objective optical system for binocular stereomicroscopes has an optical member placed to be removable or replaceable between an object to be observed and an objective lens, and satisfies the following condition:

$$0.2 < |NA \cdot m| < 1.2 \tag{1}$$

where NA is a numerical aperture on the object side of the objective lens and m is the magnification of the objective lens.

Further, according to the present invention, the high-magnification objective optical system for binocular stereomicroscopes is designed so that at least one lens unit of an objective lens can be replaced in accordance with an object to be observed, and satisfies Condition (1).

Still further, according to the present invention, the high-magnification objective optical system for binocular stereomicroscopes is designed so that lens units of an objective lens can be moved in a direction perpendicular to a specimen surface in accordance with an object to be observed, and satisfies Condition (1).

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 7A, 7B, and 7C are diagrams showing characteristics of axial coma on the object side of the objective lens in the first embodiment, corresponding to FIGS. 6A, 6B, and 6C, respectively;

FIGS. 9A and 9B are diagrams showing characteristics of axial coma on the object side of the objective lens in the second embodiment, corresponding to FIGS. 8A and 8B, respectively;

FIGS. 11A, 11B, and 11C are diagrams showing characteristics of axial coma on the object side of the objective lens in the third embodiment, corresponding to FIGS. 10A, 10B, and 10C, respectively;

FIGS. 13A and 13B are diagrams showing characteristics of axial coma on the object side of the objective lens in the fourth embodiment, corresponding to FIGS. 12A and 12B, respectively.

DETAILED DESCRIPTION OF THE PREFERRED EMBODIMENTS

Figure 1:
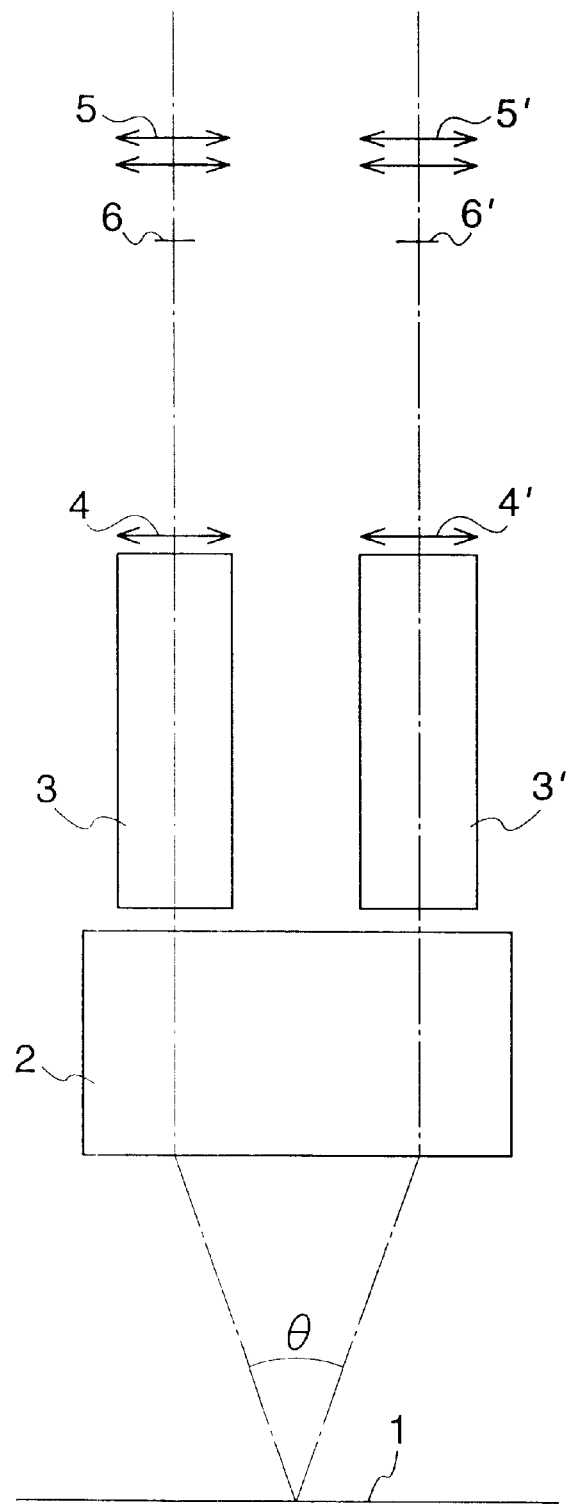
FIG. 1 is a view showing an fundamental arrangement of an optical system used in a conventional, single objective type binocular stereomicroscope.
Figure 2A:
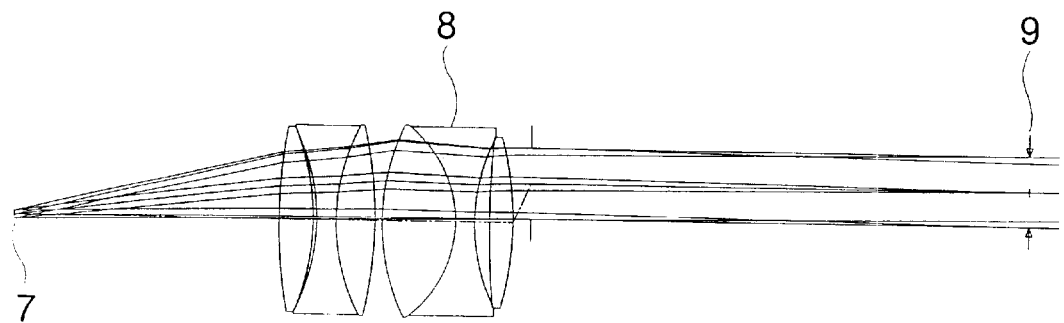
FIGS. 2A and 2B are views showing cases where a numerical aperture and a real field of view are changed by a variable magnification optical system in the single objective type binocular stereomicroscope.
Figure 2B:
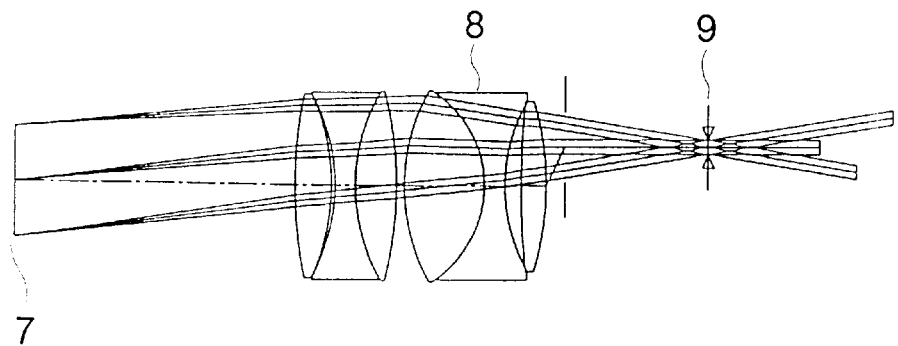
Figure 3:
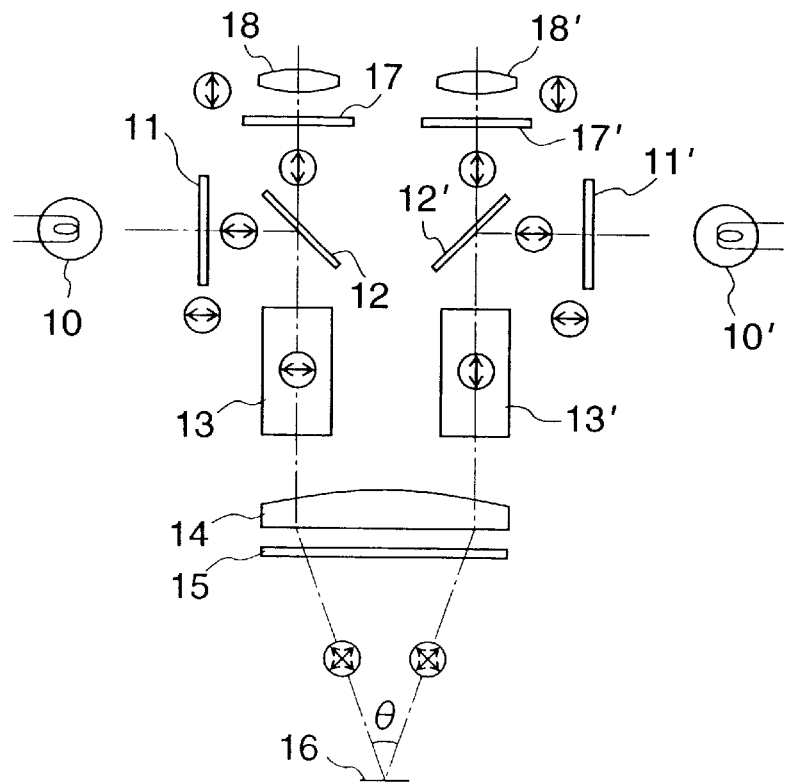
FIG. 3 is a view showing the optical system of a conventional, single objective type binocular stereomicroscope using a coaxial reflecting illumination system.
Figures 4A, 4B, 4C:
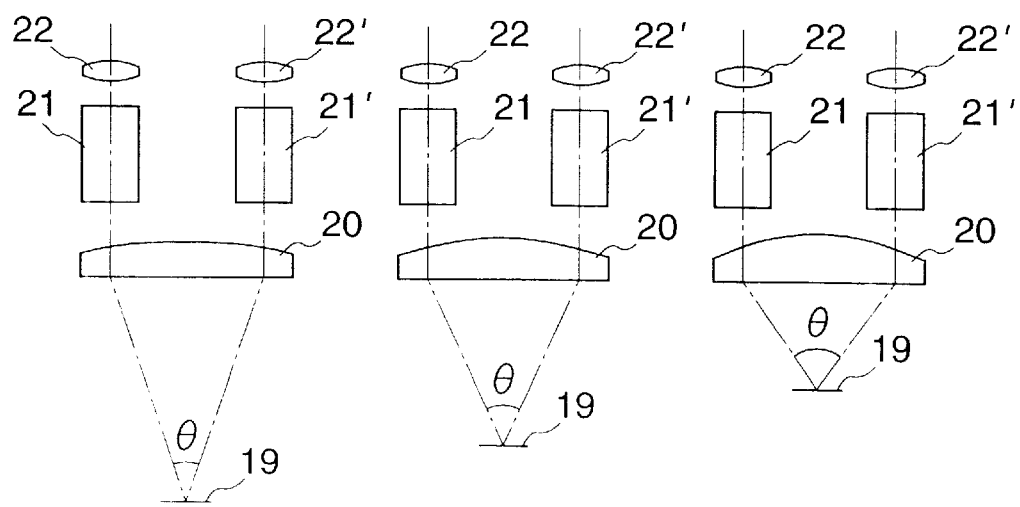
FIGS. 4A, 4B, and 4C are views for explaining cases where an internal inclination angle in the binocular stereomicroscope varies with objective lenses of low, middle, and high magnifications, respectively.
Figures 5A, 5B, 5C:
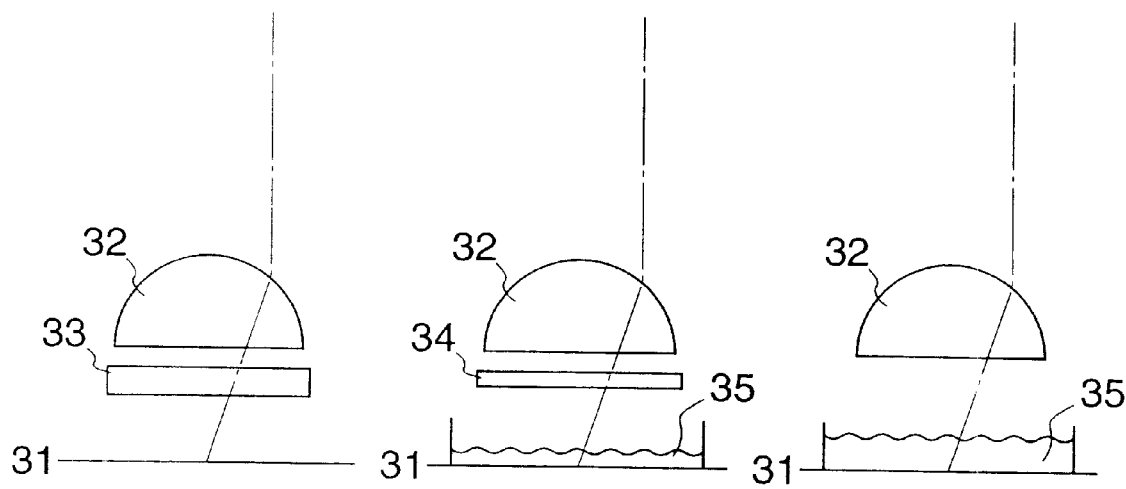
FIGS. 5A, 5B, and 5C are explanatory views for observing a specimen through an objective lens in the present invention.
Figure 14:
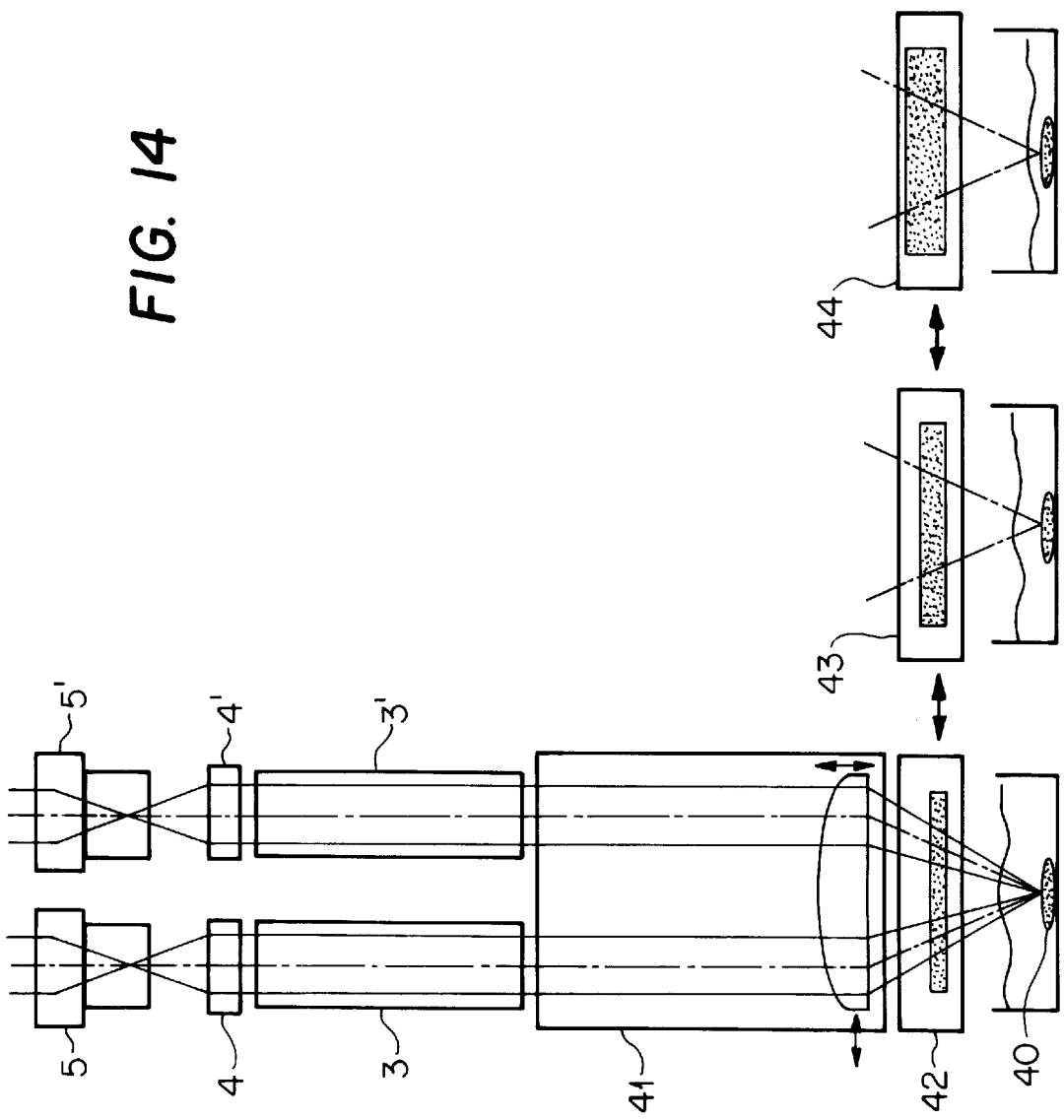
FIG. 14 is a schematic view showing the concept of the binocular stereomicroscope according to the present invention.

Before undertaking the explanation of the embodiments, the function of the present invention will be described below. According to each aspect of the present invention, as schematically shown in FIG. 14, a high-magnification objective optical system with an objective lens 41 is applied to a binocular stereomicroscope similar to that shown in FIG. 1 for observing an object 40 in different ambient conditions. According to the first aspect of the present invention, an optical member having predetermined refractive index and thickness is placed to be removable between the specimen (the object to be observed) and the objective lens. As shown in FIG. 5A, when observation is made in a state where only air exists between a specimen surface 31 and an objective lens 32 (such observation is hereinafter referred to as a dry observation), a thick optical member 33 is mounted. When an object, such as an oval cell, lying in water is observed (such observation is hereinafter referred to as a water observation), observation is made, as shown in FIG. 5B, by using a thinner optical member 34 or, as shown in FIG. 5C, without using any optical member, in accordance with the thickness (depth) of water 35 in a vessel.

Although, in this case, two kinds of optical members are used, the optical system may be designed so that three or more kinds of optical members can be replaced with one another as shown in FIG. 14 (optical members 42, 43, 44) or only one optical member can be mounted or dismounted. Such mounting and replacement need not necessarily be performed by various mount methods. Specifically, an arrangement may be made so that one optical member or a plurality of optical members are previously mounted to a microscope apparatus and are introduced into, or removed from, the optical path when necessary. In any case, by using such optical members in the present invention, an optical path length between the specimen surface 31 and the objective lens 32 is maintained to be nearly constant and the production of coma can be suppressed.

Condition (1) in the present invention defines the relationship between the NA and the magnification of the objective lens used in the present invention. If the value of |NA·m· is smaller than 0.2, a necessary resolving power will not be obtained and a blurred, dark image will merely be viewed. Beyond the upper limit of 1.2, the power of each of lens units constituting the objective lens itself becomes too high and the internal inclination angle increases. Consequently, aberration is considerably produced, and in the objective lens for single objective type binocular stereomicroscopes which constitutes a decentering optical system, it is difficult to correct for aberration.

In the present invention, it is desirable that the optical member is a plane-parallel plate and is placed to be parallel (usually horizontal) to the specimen surface. If the optical member has a wedge shape or is inclined, the deterioration of images becomes prominent. If this inclination occurs with respect to a lateral axis in an observation state, the images will undergo only deterioration in their vertical direction. However, if it occurs with respect to a longitudinal axis, the images produced in the optical paths on the left and right sides will be different, and thus they are fused with the eyes and cease to be observable. In this way, the function of the stereomicroscope will be impaired. Here, the lateral axis refers to an axis extending in a lateral direction in the plane of the figure, for example, in FIG. 1, and coincides with a solid line indicating the object 1. The longitudinal axis is an axis extending in a direction normal to the plane of the figure.

When the optical member in the present invention is constructed with a quarter-wave plate having parallels and is placed to be rotatable in a plane parallel to the specimen surface, observation with the coaxial reflecting illumination can be favorably performed. In this case, since the quarter-wave plate is mounted to be rotatable, its optic axis can be oriented at an optimum position, irrespective of the orientation of the quarter-wave plate. In a polarizing observation with transmitting illumination or reflecting illumination, the optic axis of the quarter-wave plate is aligned with an analyzer, and thereby the effect of the quarter-wave plate is eliminated so that a good polarizing observation can be made. Where observation is made in the visual field of transmitting illumination, good performance of image formation which is favorable in contrast is secured, without removing the quarter-wave plate, even though an objective lens with high magnification and NA is used. Thus, by using such an objective lens, the dry observation with transmitting illumination or coaxial reflecting illumination becomes possible, and if the quarter-wave plate is removed, the water observation can be made.

According to the second aspect of the present invention, in the binocular stereomicroscope, at least one lens unit of the objective lens can be replaced in accordance with an object to be observed as indicated by the horizontal arrow shown in FIG. 14 and Condition (1) is satisfied. Each optical axis of the binocular stereomicroscope is not perpendicular but oblique with respect to the specimen surface. As such, for example, marginal rays which pass through both sides of the optical axis of an optical path for the right eye going through the objective lens have different angles of incidence on the specimen. In the stereomicroscope, therefore, the marginal rays are not symmetrical with respect to the optical axis. For this reason, aberration, although due originally to an axial ray, produced by the marginal rays in the stereomicroscope is to be treated as coma, not as spherical aberration. If media with different refractive indices are interposed between the specimen surface and the objective lens, the optical path length will be changed and considerable aberration will be yielded. Thus, a lens unit having a significant effect on the focal length and coma, of the objective lens, is replaced with another lens unit accommodating such interposed media so that good performance of image formation is obtained.

In the case of the single objective type binocular stereomicroscope in particular, because its optical axis does not lie at the center of the objective lens, it is necessary, not to suppress spherical aberration in accordance with the optical path length at the center of a lens unit for replacement, but to suppress axial coma in accordance with the optical path lengths of decentered optical axes. Specifically, it is necessary to equalize, to some extent, the optical path length of the optical axis ranging from a lens unit for replacement to the specimen surface in the case where the medium is absent, with the optical path length of each decentered optical axis ranging from a replaced lens unit to the specimen surface in the case where the medium is present, and to provide a lens unit by which the production of the axial coma is suppressed.

According to the third aspect of the present invention, in the binocular stereomicroscope, a lens unit of the objective lens can be moved in a direction perpendicular to the specimen surface as indicated by the vertical arrow shown in FIG. 14 and Condition (1) is satisfied. As already mentioned, when the medium with a certain refractive index is interposed between the specimen surface and the objective lens, the performance of image formation is deteriorated by the change of the optical path length and the production of coma. Consequently, the present invention is designed to move a lens unit having a significant effect on the focal length and coma, of the objective lens, and to correct distances between lens units affecting chromatic aberration, thereby bringing about good performance of image formation.

In the first aspect of the present invention, the thickness of water is corrected every 1 mm by replacing the optical member, in accordance with the refractive index of the medium, and every 0.1 mm by changing the distance between lens units. In this way, the thickness of water can be corrected with a higher degree of accuracy. Similarly, in the second aspect of the present invention, when it is corrected, for example, every 1 mm by replacing a front lens unit and every 0.1 mm by adjusting the distance between lens units, correction can be made with remarkable accuracy.

In the above-mentioned three aspects, a favorable high-magnification objective lens for binocular stereomicroscopes is obtained when an arrangement is made so as to satisfy the following condition:

$$|m^2 \cdot \Delta DZ| < 0.2 \quad (2)$$

where $\Delta DZ$ is a difference between the maximum and the minimum of axial coma regarding the left and right optical paths on the specimen surface. Where the medium is interposed between the specimen and the objective lens, spherical aberration is evenly produced around the optical axis in an ordinary microscope, and thus the image is symmetrically blurred. In the binocular stereomicroscope, by contrast, the image is deformed asymmetrically with respect to each optical axis. In particular, in the single objective type binocular stereomicroscope, the image, because its original asymmetry, suffers further deterioration and is fluidly deformed.

In the single objective type binocular stereomicroscope, the amount of axial coma is such that the deformation of the image is more considerable in the peripheral region of the objective lens than in the middle region thereof (namely, in a region lying outside the optical axes of the optical paths for the eyes than in a region sandwiched between the optical axes), looking from the direction of the optical axes. Further, with increasing magnification, it is necessary to suppress aberration accordingly. Hence, if the value of $|m^2 \cdot \Delta DZ|$ is more than 0.2, coma becomes prominent and actual deterioration of the image is clearly seen. In order to obtain a stereomicroscope with good performance and quality, this value must be less than 0.2.

As has been mentioned, when the objective optical system of the binocular stereomicroscope is constructed as in the above aspects, a stereoscopic observation can be attained, holding good performance of image formation at high magnification and NA, even when media of different refractive indices are interposed between the specimen surface and the objective lens. Also, in the disclosure so far, reference has been mainly made to the single objective type binocular stereomicroscope. However, the present invention is not limited to the single objective type, and even when the Greenough type is used, the same effect can be secured.

In accordance with the drawings and numerical data, the embodiments of the present invention will be described below. Also, in the numerical data, m denotes a magnification; FL denotes a combined focal length of the entire system; WD denotes a working distance; $\Delta DZ$ denotes a difference between the maximum and the minimum of axial coma; $r_1, r_2, \ldots$ denote radii of curvature of individual lenses or plane-parallel plates; $d_1, d_2, \ldots$ denote thicknesses of individual lenses or members, or spaces therebetween; $n_1, n_2, \ldots$ denote refractive indices of individual lenses or members in the d line; and $\nu_1, \nu_2, \ldots$ denote Abbe's numbers of individual lenses or members. Lengths shown are all in millimeters.

First Embodiment

Figure 6A:
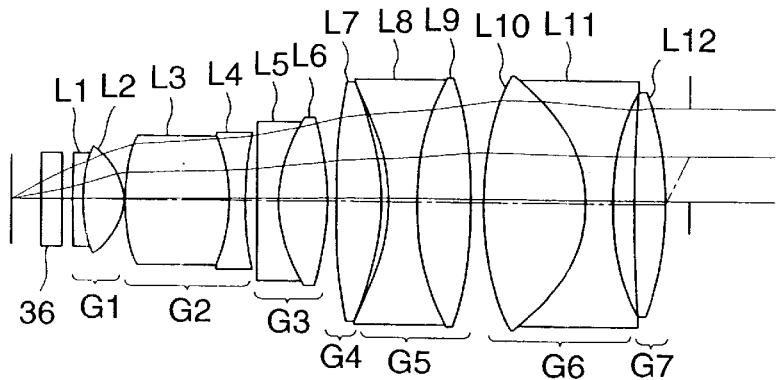
FIGS. 6A, 6B, and 6C are sectional views showing arrangements of the objective lens in a first embodiment of the high-magnification objective optical system for binocular stereomicroscopes according to the present invention, corresponding to FIGS. 5A, 5B, and 5C, respectively.

The first embodiment is explained with reference to FIGS. 6A, 6B, and 6C and FIGS. 7A, 7B, and 7C. FIG. 6A shows the case of the dry observation, in which a plane-parallel plate 36 with a thickness of 4 mm is placed on the object (specimen) side. Where the plane-parallel plate 36 is constructed with a quarter-wave plate, observation can be made, without flare, at high magnification and NA by the coaxial reflecting illumination. The objective lens of the first embodiment is comprised of 7 lens units. A first lens unit G1 is a cemented lens including a negative meniscus lens L1 which is convex toward the object and a biconvex lens L2. A second lens unit G2 is a cemented lens including a biconvex lens L3 and a biconcave lens L4, and a third lens unit G3 is composed of a biconcave lens L5 and a biconvex lens L6. A fourth lens unit G4 is a biconvex lens L7, a fifth lens unit G5 is composed of a biconcave lens L8 and a biconvex lens L9, a sixth lens unit G6 includes a biconvex lens L10 and a biconcave lens L11, and a seventh lens unit G7 is a biconvex lens L12.

Numerical data in this case are as shown in Table 1. The characteristics of axial coma are plotted in FIG. 7A.

TABLE 1

| WD = 6.4634 | | | |
|---|---|---|---|
| $r_1 = \infty$ | $d_1 = 4.0$ | $n_1 = 1.52287$ | $\nu_1 = 59.89$ |
| $r_2 = \infty$ | $d_2 = 1.5$ | | |
| $r_3 = 133.821$ | $d_3 = 2.198$ | $n_3 = 1.79952$ | $\nu_3 = 42.22$ |

TABLE 1-continued

WD = 6.4634

| | | | |
|---|---|---|---|
| $r_4$ = 35.527 | $d_4$ = 8.627 | $n_4$ = 1.49700 | $v_4$ = 81.54 |
| $r_5$ = −15.960 | $d_5$ = 0.13 | | |
| $r_6$ = 39.243 | $d_6$ = 22.3 | $n_6$ = 1.49700 | $v_6$ = 81.61 |
| $r_7$ = −43.481 | $d_7$ = 3.4 | $n_7$ = 1.71850 | $v_7$ = 33.52 |
| $r_8$ = 64.339 | $d_8$ = 2.7 | | |
| $r_9$ = −6321.393 | $d_9$ = 4.0 | $n_9$ = 1.75500 | $v_9$ = 52.33 |
| $r_{10}$ = 32.302 | $d_{10}$ = 9.9 | $n_{10}$ = 1.72342 | $v_{10}$ = 37.95 |
| $r_{11}$ = −85.233 | $d_{11}$ = 2.0 | | |
| $r_{12}$ = 137.710 | $d_{12}$ = 9.8 | $n_{12}$ = 1.62280 | $v_{12}$ = 57.04 |
| $r_{13}$ = −65.473 | $d_{13}$ = 1.1 | | |
| $r_{14}$ = −55.905 | $d_{14}$ = 5.5 | $n_{14}$ = 1.64450 | $v_{14}$ = 40.82 |
| $r_{15}$ = 55.905 | $d_{15}$ = 11.3 | $n_{15}$ = 1.49700 | $v_{15}$ = 81.61 |
| $r_{16}$ = −110.616 | $d_{16}$ = 2.1 | | |
| $r_{17}$ = 59.222 | $d_{17}$ = 21.3 | $n_{17}$ = 1.65016 | $v_{17}$ = 39.39 |
| $r_{18}$ = −33.156 | $d_{18}$ = 5.5 | $n_{18}$ = 1.64450 | $v_{18}$ = 40.82 |
| $r_{19}$ = 51.848 | $d_{19}$ = 4.3 | | |
| $r_{20}$ = 248.625 | $d_{20}$ = 6.8 | $n_{20}$ = 1.48479 | $v_{20}$ = 70.21 |
| $r_{21}$ = −87.040 | | | |

FL = 36
m = 2.5
NA = 0.28
ΔDZ = 0.0105

Figure 6B:
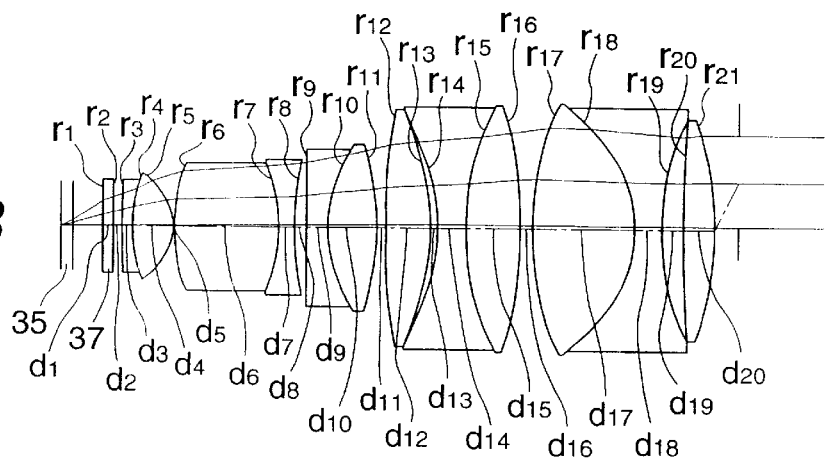

FIG. 6B shows the case of the water observation. Since, in this case, the thickness (depth) of the water 35 is about 2.2 mm, the plane-parallel plate 36 in FIG. 6A is replaced with a plane-parallel plate 37 with a thickness of 2 mm and thereby a favorable image can be obtained. Numerical data in this case are as shown in Table 2, and the characteristics of axial coma are plotted in FIG. 7B. Also, the arrangement of the lens units subsequent to the first lens unit G1 is exactly the same as in the FIG. 6A, and thus the corresponding data are omitted from Table 2.

TABLE 2

Water thickness = 2.2035
WD = 6.1238

| | | | |
|---|---|---|---|
| $r_1$ = ∞ | $d_1$ = 2.0 | $n_1$ = 1.52287 | $v_1$ = 59.89 |
| $r_2$ = ∞ | $d_2$ = 1.5 | | |

(Subsequent data are the same as in Table 1.)
FL = 36
m = 2.5
NA = 0.28
ΔDZ = 0.0149

Figure 6C:
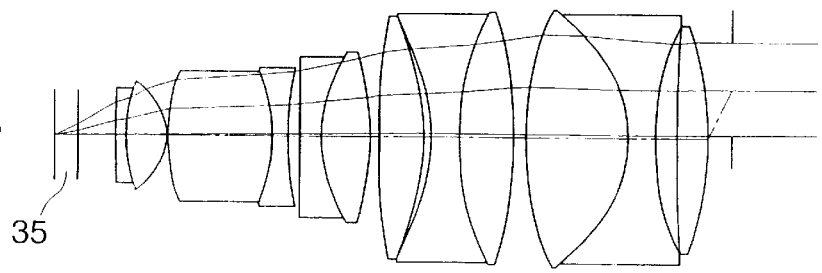

FIG. 6C shows the case of the water observation which is the same as in FIG. 6B. Since, in this case, the thickness (depth) of the water 35 is twice that in the case of FIG. 6B, the plane-parallel plate 37 placed in FIG. 6B is removed and thereby a favorable image is brought about. Numerical data in this case are as shown in Table 3, and the characteristics of axial coma are plotted in FIG. 7C. The arrangement of lens units and their relative relationships are exactly the same as the cases of FIGS. 6A and 6B, and thus the corresponding data are omitted from Table 3.

TABLE 3

Water thickness = 4.4070
WD = 5.7841
FL = 36
m = 2.5
NA = 0.28
ΔDZ = 0.0203

Second Embodiment

Figure 8A:
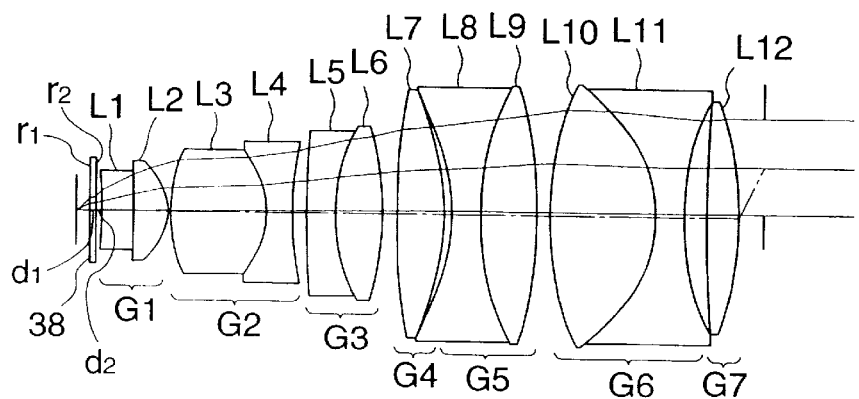
FIGS. 8A and 8B are sectional views showing arrangements of the objective lens in a second embodiment of the high-magnification objective optical system for binocular stereomicroscopes according to the present invention, corresponding to cases of a dry observation and a water observation, respectively.

The second embodiment is explained with reference to FIGS. 8A and 8B and FIGS. 9A and 9B. FIG. 8A shows the case of the dry observation, in which a plane-parallel plate 38 with a thickness of 1.5 mm is placed on the object (specimen) side. In this embodiment also, where the plane-parallel plate 38 is constructed with a quarter-wave plate, observation can be made, without flare, at high magnification and NA by the coaxial reflecting illumination. The objective lens of the second embodiment, like the first embodiment, is comprised of 7 lens units. The first lens unit G1 is a cemented lens including the negative meniscus lens L1 which is concave toward the object and the positive meniscus lens L2 which is concave toward the object, the second lens unit G2 is a cemented lens including the biconvex lens L3 and the biconcave lens L4, and the third lens unit G3 is composed of the negative meniscus lens L5 which is convex toward the object and the biconvex lens L6. The fourth lens unit G4 is the biconvex lens L7, the fifth lens unit G5 is composed of the biconcave lens L8 and the biconvex lens L9, the sixth lens unit G6 includes the biconvex lens L10 and the biconcave lens L11, and the seventh lens unit G7 is the biconvex lens L12.

Numerical data in this case are as shown in Table 4. The characteristics of axial coma are plotted in FIG. 9A.

TABLE 4

WD = 2.5129

| | | | |
|---|---|---|---|
| $r_1$ = ∞ | $d_1$ = 1.5 | $n_1$ = 1.52287 | $v_1$ = 59.89 |
| $r_2$ = ∞ | $d_2$ = 0.7 | | |
| $r_3$ = −67.993 | $d_3$ = 6.2 | $n_3$ = 1.51633 | $v_3$ = 64.14 |
| $r_4$ = −1357.079 | $d_4$ = 6.8 | $n_4$ = 1.62280 | $v_4$ = 57.05 |
| $r_5$ = −13.455 | $d_5$ = 0.4 | | |
| $r_6$ = 30.245 | $d_6$ = 19.4 | $n_6$ = 1.49700 | $v_6$ = 81.61 |
| $r_7$ = −19.424 | $d_7$ = 5.1 | $n_7$ = 1.71850 | $v_7$ = 33.52 |
| $r_8$ = 56.501 | $d_8$ = 2.7 | | |
| $r_9$ = 271.504 | $d_9$ = 5.29 | $n_9$ = 1.77250 | $v_9$ = 49.60 |
| $r_{10}$ = 30.787 | $d_{10}$ = 9.99 | $n_{10}$ = 1.72342 | $v_{10}$ = 37.95 |
| $r_{11}$ = −63.333 | $d_{11}$ = 2.8 | | |
| $r_{12}$ = 137.710 | $d_{12}$ = 9.8 | n12= 1.62280 | $v_{12}$ = 57.04 |
| $r_{13}$ = −65.473 | $d_{13}$ = 1.1 | | |
| $r_{14}$ = −55.905 | $d_{14}$ = 5.5 | $n_{14}$ = 1.64450 | $v_{14}$ = 40.82 |
| $r_{15}$ = 55.905 | $d_{15}$ = 11.3 | $n_{15}$ = 1.49700 | $v_{15}$ = 81.61 |
| $r_{16}$ = −110.616 | $d_{16}$ = 2.1 | | |
| $r_{17}$ = 59.222 | $d_{17}$ = 21.3 | $n_{17}$ = 1.65016 | $v_{17}$ = 39.39 |
| $r_{18}$ = −33.156 | $d_{18}$ = 5.5 | $n_{18}$ = 1.64450 | $v_{18}$ = 40.82 |
| $r_{19}$ = 51.848 | $d_{19}$ = 4.3 | | |
| $r_{20}$ = 248.625 | $d_{20}$ = 6.8 | $n_{20}$ = 1.48479 | $v_{20}$ = 70.21 |
| $r_{21}$ = −87.040 | | | |

FL = 30
m = 3
NA = 0.33
ΔDZ = 0.0056

Figure 8B:
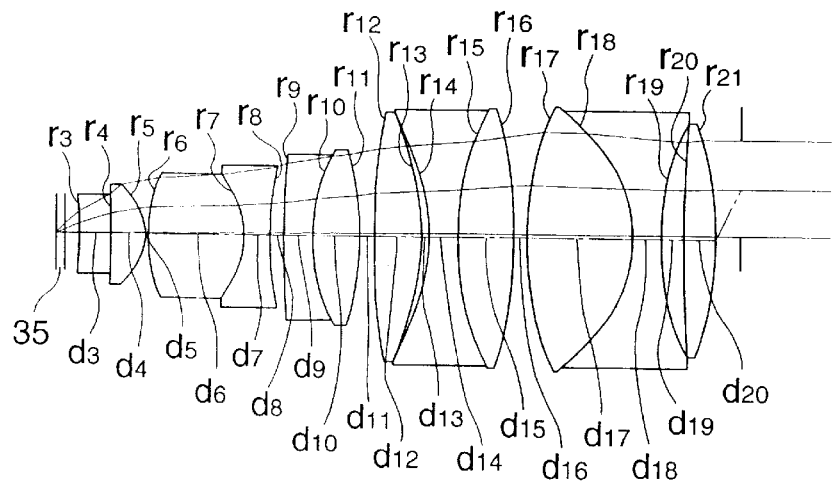

FIG. 8B shows the case of the water observation. Since, in this case, the thickness (depth) of the water 35 is about 1.63 mm, the plane-parallel plate 38 placed in FIG. 8A is removed and thereby a favorable image is brought about.

Numerical data in this case are as shown in Table 5, and the characteristics of axial coma are plotted in FIG. 9B. The arrangement of lens units and their relative relationships are exactly the same as the case of FIG. 8A, and thus the corresponding data are omitted from Table 5.

TABLE 5

Water thickness = 1.6245
WD = 2.2793
FL = 30
m = 3
NA = 0.33
ΔDZ = 0.01505

Third Embodiment

Figure 10A:
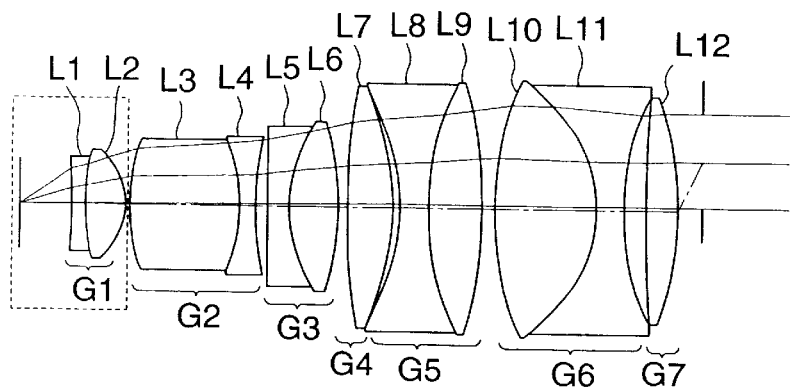
FIGS. 10A, 10B, and 10C are sectional views showing arrangements of the objective lens in a third embodiment of the high-magnification objective optical system for binocular stereomicroscopes according to the present invention, corresponding to cases of a dry observation, a water observation based on a predetermined water thickness, and a water observation based on a different water thickness, respectively.

The third embodiment is explained with reference to FIGS. 10A, 10B, and 10C and FIGS. 11A, 11B, and 11C. FIG. 10A shows the case of the dry observation, in which the objective lens is comprised of 7 lens units. The first lens unit G1 is a cemented lens including the biconcave lens L1 and the biconvex lens L2, the second lens unit G2 is a cemented lens including the biconvex lens L3 and the biconcave lens L4, and the third lens unit G3 is composed of the biconcave lens L5 and the biconvex lens L6. The fourth lens unit G4 is the biconvex lens L7 and the fifth lens unit G5 is composed of the biconcave lens L8 and the biconvex lens L9. The sixth lens unit G6 includes the biconvex lens L10 and the biconcave lens L11 and the seventh lens unit G7 is the biconvex lens L12.

Numerical data in this case are as shown in Table 6. The characteristics of axial coma are plotted in FIG. 11A.

TABLE 6

| | | | |
|---|---|---|---|
| WD = 9.6515 | | | |
| $r_1 = -249.244$ | | | |
| | $d_1 = 2.9$ | $n_1 = 1.83400$ | $v_1 = 37.17$ |
| $r_2 = 61.037$ | | | |
| | $d_2 = 8.6$ | $n_2 = 1.49700$ | $v_2 = 81.54$ |
| $r_3 = -14.328$ | | | |
| | $d_3 = 0.4$ | | |
| $r_4 = 39.243$ | | | |
| | $d_4 = 22.3$ | $n_4 = 1.49700$ | $v_4 = 81.61$ |
| $r_5 = -43.481$ | | | |
| | $d_5 = 3.4$ | $n_5 = 1.71850$ | $v_5 = 33.52$ |
| $r_6 = 64.339$ | | | |
| | $d_6 = 2.7$ | | |
| $r_7 = -6321.393$ | | | |
| | $d_7 = 4.0$ | $n_7 = 1.75500$ | $v_7 = 52.33$ |
| $r_8 = 32.302$ | | | |
| | $d_8 = 9.9$ | $n_8 = 1.72342$ | $v_8 = 37.95$ |
| $r_9 = -85.233$ | | | |
| | $d_9 = 2.0$ | | |
| $r_{10} = 137.710$ | | | |
| | $d_{10} = 9.8$ | $n_{10} = 1.62280$ | $v_{10} = 57.04$ |
| $r_{11} = -65.473$ | | | |
| | $d_{11} = 1.1$ | | |
| $r_{12} = -55.905$ | | | |
| | $d_{12} = 5.5$ | $n_{12} = 1.64450$ | $v_{12} = 40.82$ |
| $r_{13} = 55.905$ | | | |
| | $d_{13} = 11.3$ | $n_{13} = 1.49700$ | $v_{13} = 81.61$ |
| $r_{14} = -110.616$ | | | |
| | $d_{14} = 2.1$ | | |
| $r_{15} = 59.222$ | | | |
| | $d_{15} = 21.3$ | $n_{15} = 1.65016$ | $v_{15} = 39.39$ |
| $r_{16} = -33.156$ | | | |
| | $d_{16} = 5.5$ | $n_{16} = 1.64450$ | $v_{16} = 40.82$ |
| $r_{17} = 51.848$ | | | |
| | $d_{17} = 4.3$ | | |

TABLE 6-continued

| | | | |
|---|---|---|---|
| WD = 9.6515 | | | |
| $r_{18} = 248.625$ | | | |
| | $d_{18} = 6.8$ | $n_{18} = 1.48479$ | $v_{18} = 70.21$ |
| $r_{19} = -87.040$ | | | |

FL = 36
m = 2.5
NA = 0.28
ΔDZ = 0.0105

Figure 10B:
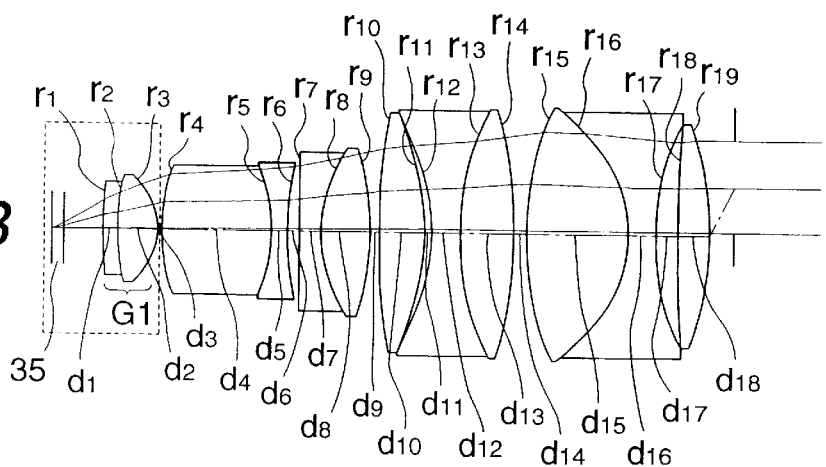

FIG. 10B shows the case of the water observation. In this case, the first lens unit G1 shown in FIG. 10A is replaced with a lens unit according to the thickness (depth) of the water 35 and thereby favorable performance of image formation can be obtained. Hence, the first lens unit G1 shown in FIG. 10B is different from the first lens unit G1 of FIG. 10A, and because the thickness (depth) of the water 35 is 2 mm, the lens unit is replaced accordingly. Numerical data in this case are as shown in Table 7, and the characteristics of axial coma are plotted in FIG. 11B. Also, the arrangement of the lens units subsequent to the second lens unit G2 is exactly the same as in the FIG. 10A, and thus the corresponding data are omitted from Table 7.

TABLE 7

| | | | |
|---|---|---|---|
| Water thickness = 2.0 | | | |
| WD = 8.1849 | | | |
| $r_1 = 260.834$ | | | |
| | $d_1 = 2.8$ | $n_1 = 1.80610$ | $v_1 = 40.92$ |
| $r_2 = 40.346$ | | | |
| | $d_2 = 9.2$ | $n_2 = 1.49700$ | $v_2 = 81.54$ |
| $r_3 = -15.397$ | | | |
| | $d_3 = 0.19$ | | |

(Subsequent data are the same as in Table 6.)
FL = 36
m = 2.5
NA = 0.28
ΔDZ = 0.0012

Figure 10C:
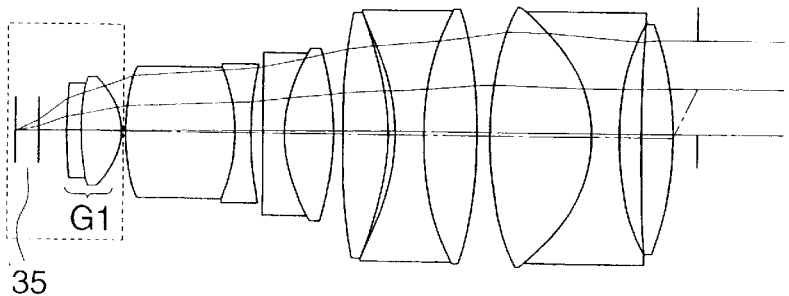

FIG. 10C shows the case of the water observation which is the same as in FIG. 10B. Since, in this case, the thickness (depth) of the water 35 is 4 mm, the first lens unit G1 is replaced accordingly. Numerical data in this case are as shown in Table 8, and the characteristics of axial coma are plotted in FIG. 11B. Also, the arrangement of the lens units subsequent to the second lens unit G2 is exactly the same as in the FIG. 10A, and thus the corresponding data are omitted from Table 8.

TABLE 8

| | | | |
|---|---|---|---|
| Water thickness = 4.0 | | | |
| WD = 7.5078 | | | |
| $r_1 = 137.897$ | | | |
| | $d_1 = 2.7$ | $n_1 = 1.83481$ | $v_1 = 42.72$ |
| $r_2 = 38.570$ | | | |
| | $d_2 = 8.4$ | $n_2 = 1.49700$ | $v_2 = 81.54$ |
| $r_3 = -15.866$ | | | |
| | $d_3 = 0.1$ | | |

(Subsequent data are the same as in Table 6.)
FL = 36
m = 2.5
NA = 0.28
ΔDZ = 0.0009

Fourth Embodiment

Figure 12A:
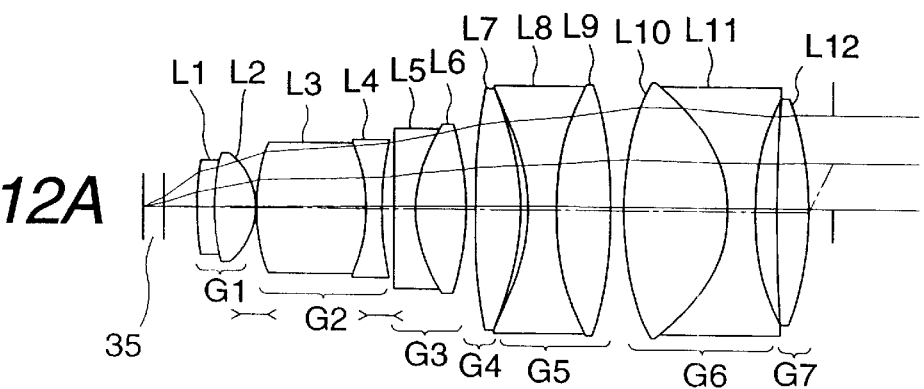
FIGS. 12A and 12B are sectional views showing arrangements of the objective lens in a fourth embodiment of the high-magnification objective optical system for binocular stereomicroscopes according to the present invention, corresponding to cases of a water observation based on a predetermined water thickness and a water observation based on a different water thickness, respectively.
Figure 12B:
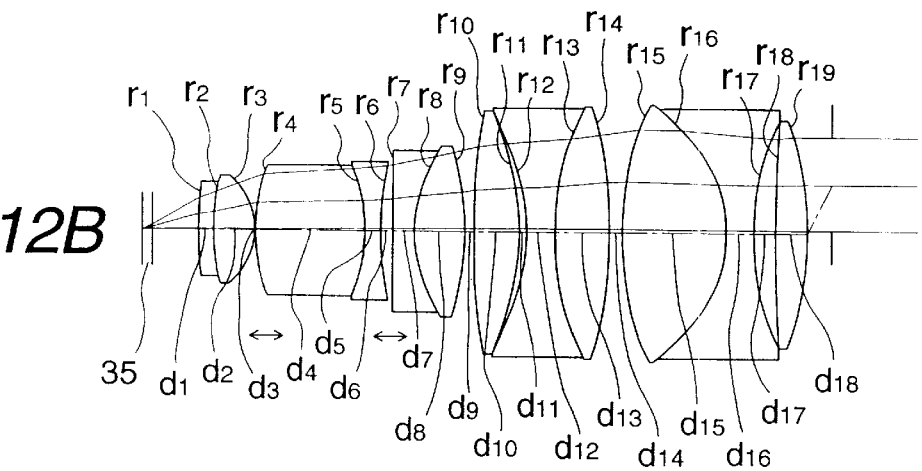

Finally, the fourth embodiment is described with reference to FIGS. 12A and 12B and FIGS. 13A and 13B. The fundamental arrangement of the objective lens in this embodiment is identical with the arrangement of the third embodiment shown in FIG. 10B. However, the fourth embodiment is designed so that distances between the first lens unit G1 and the second lens unit G2 and between the second lens unit G2 and the third lens unit G3 are capable of changing with the thickness (depth) of the water 35. FIG. 12A shows the case where the thickness (depth) of the water 35, in contrast with that of FIG. 10B, increases by 0.2 mm. FIG. 12B shows the case where it decreases by 0.2 mm. An arrangement is such that, in the former case, the distances between the lens units mentioned above reduce, each by 0.1 mm, while in the latter case, they increase, each by 0.1 mm. The numerical data and the characteristics of axial coma in the former case are shown in Table 9 and FIG. 13A, respectively, and those in the latter case are shown in Table 10 and FIG. 13B, respectively. For the above reason, however, the numerical data of the lens units subsequent to the fourth lens unit G4 are omitted from Tables 9 and 10.

TABLE 9

Water thickness = 2.2
WD = 8.0968

| $r_1 = 260.834$ | | | |
|---|---|---|---|
| | $d_1 = 2.8$ | $n_1 = 1.80610$ | $\nu_1 = 40.92$ |
| $r_2 = 40.346$ | | | |
| | $d_2 = 9.2$ | $n_2 = 1.49700$ | $\nu_2 = 81.54$ |
| $r_3 = -15.397$ | | | |
| | $d_3 = 0.09$ | | |
| $r_4 = 39.243$ | | | |
| | $d_4 = 22.3$ | $n_4 = 1.49700$ | $\nu_4 = 81.61$ |
| $r_5 = -43.481$ | | | |
| | $d_5 = 3.4$ | $n_5 = 1.71850$ | $\nu_5 = 33.52$ |
| $r_6 = 64.339$ | | | |
| | $d_6 = 2.6$ | | |

(Subsequent data are the same as in Table 6.)
FL = 36
m = 2.5
NA = 0.28
ΔDZ = 0.0067

TABLE 10

Water thickness = 1.8
WD = 8.2728

| $r_1 = 260.834$ | | | |
|---|---|---|---|
| | $d_1 = 2.8$ | $n_1 = 1.80610$ | $\nu_1 = 40.92$ |
| $r_2 = 40.346$ | | | |
| | $d_2 = 9.2$ | $n_2 = 1.49700$ | $\nu_2 = 81.54$ |
| $r_3 = -15.397$ | | | |
| | $d_3 = 0.29$ | | |
| $r_4 = 39.243$ | | | |
| | $d_4 = 22.3$ | $n_4 = 1.49700$ | $\nu_4 = 81.61$ |
| $r_5 = -43.481$ | | | |
| | $d_5 = 3.4$ | $n_5 = 1.71850$ | $\nu_5 = 33.52$ |
| $r_6 = 64.339$ | | | |
| | $d_6 = 2.8$ | | |

(Subsequent data are the same as in Table 6.)
FL = 36
m = 2.5
NA = 0.28
ΔDZ = 0.0045

What is claimed is:

1. A high-magnification objective optical system comprising an objective lens, said objective optical system being a binocular stereomicroscope objective optical system which is adapted to two observation optical systems constructed and arranged side by side to be symmetrical about a center axis of said objective lens so that light from an object is formed into left and right images through said objective lens, wherein said high-magnification objective optical system is provided with an optical member placed to be removable and replaceable between said object and said objective lens and satisfies the following condition:

$$0.2 < |NA \cdot m| < 1.2$$

where NA is a numerical aperture of an optical system including said objective optical system and one of said two observation optical systems, calculated by $$NA = n \sin u$$

with n being a refractive index of a medium on an object side, and u being an angle, in said medium, formed between a center ray travelling, along an optical axis of the observation optical system and an outermost ray, out of a bundle of rays that emerge from an object point on the center axis of said objective lens and that enter the observation optical system to form the image, and m is a magnification of aid objective lens.

2. A high-magnification objective optical system according to claim 1, wherein said optical member placed to be removable and replaceable between said object and said objective lens is a plane-parallel plate held parallel with a specimen surface.

3. A high-magnification objective optical system according to claim 2, wherein said plane-parallel plate is a quarter-wave plate, said plane-parallel plate being rotatable in a plane parallel to a specimen surface.

4. A high-magnification objective optical system according to claim 1, wherein lens units of said objective lens are movable in a direction perpendicular to a specimen surface.

5. A high-magnification objective optical system according to claim 1, wherein said objective lens has a working distance greater than 2.2 mm.

6. A high-magnification objective optical system comprising an objective lens, said objective optical system being a binocular stereomicroscope objective optical system which is adapted to two observation optical systems constructed and arranged side by side to be symmetrical about a center axis of said objective lens so that light from an object is formed into left and right images through said objective lens, wherein said high-magnification objective optical system is constructed so that at least one lens unit of said objective lens is replaceable in accordance with said object and satisfies the following condition:

$$0.2 < |NA \cdot m| < 1.2$$

where NA is a numerical aperture of an optical system including said objective optical system and one of said two observation optical systems, calculated by $$NA = n \sin u$$

with n being a refractive index of a medium on an object side, and u being an angle, in said medium, formed between a center ray travelling alone an optical axis of the observation optical system and an outermost ray, out of a bundle of rays that emerge from an object point on the center axis of said objective lens and that enter the observation optical system to form the image, and m is a magnification of aid objective lens.

7. A high-magnification objective optical system according to claim 2, wherein lens units of said objective lens are movable in a direction perpendicular to a specimen surface.

8. A high-magnification objective optical system comprising an objective lens, said objective optical system being a binocular stereomicroscope objective optical system which is adapted to two observation optical systems constructed and arranged side by side to be symmetrical about a center axis of said objective lens so that light from an object is formed into left and right images through said objective lens,
wherein said high-magnification objective optical system is constructed so that lens units of said objective lens are movable in a direction perpendicular to a specimen surface in accordance with said object and satisfies the following condition:

$0.2 < |NA \cdot m| < 1.2$ where NA is a numerical aperture of an optical system including said objective optical system and one of said two observation optical systems, calculated by $NA = n \sin u$ with n being a refractive index of a medium on an object side, and u being an ankles in said medium, formed between a center ray travelling along an optical axis of the observation optical system and an outermost ray, out of a bundle of rays that emerge from an object point on the center axis of said objective lens and that enter the observation optical system to form the image, and m is a magnification of said objective lens.

9. A high-magnification objective optical system, comprising an objective lens, said objective optical system being a binocular stereomicroscope objective optical system having two observation optical systems constructed and arranged to form light from an object into left and right images through said objective lens,
wherein said high-magnification objective optical system is provided with an optical member placed to be removable and replaceable between said object and said objective lens and satisfies the following condition:

$0.2 < |NA \cdot m| < 1.2$ where NA is a numerical aperture on an object side of said objective lens for each of left and right optical paths formed by said two observation optical systems, and m is a magnification of said objective lens
said high-magnification objective optical system further satisfying the following condition:

$|m^2 \cdot \Delta DZ| < 0.2$ where $\Delta DZ$ is a difference between a maximum and a minimum of axial coma regarding each of the left and right optical paths on a specimen surface.

10. A high-magnification objective optical system comprising an objective lens, said objective optical system being a binocular stereomicroscope objective optical system having two observation optical systems constructed and arranged to form light from an object into left and right images through said objective lens,
wherein said high-magnification objective optical system is constructed so that at least one lens unit of said objective lens is replaceable in accordance with said object and satisfies the following condition:

$0.2 < |NA \cdot m| < 1.2$ where NA is a numerical aperture on an object side of said objective lens for each of left and right optical paths formed by said two observation optical systems, and m is a magnification of said objective lens,
said high-magnification objective optical system further satisfying the following condition:

$|m^2 \cdot \Delta DZ| < 0.2$ where $\Delta DZ$ is a difference between a maximum and a minimum of axial coma regarding each of the left and right optical paths on a specimen surface.

11. A high-magnification objective optical system comprising an objective lens, said objective optical system being a binocular stereomicroscope objective optical system having two observation optical systems constructed and arranged to form light from an object into left and right images through said objective lens,
wherein said high-magnification objective optical system is constructed so that lens units of said objective lens are movable in a direction perpendicular to a specimen surface in accordance with said object and satisfies the following condition:

$0.2 < |NA \cdot m| < 1.2$ where NA is a numerical aperture on an object side of said objective lens for each of left and right optical paths formed by said two observation optical systems, and m is a magnification of said objective lens,
said high-magnification objective optical system further satisfying the following condition:

$|m^2 \cdot \Delta DZ| < 0.2$ where $\Delta DZ$ is a difference between a maximum and a minimum of axial coma regarding each of the left and right optical paths on a specimen surface.

12. A binocular stereomicroscope, comprising:
a high-magnification objective optical system including an objective lens; and
a pair of observation optical systems that form light from an object into left and right images through said objective lens, each of said observation optical systems including an imaging lens and an eyepiece;
wherein said high-magnification objective optical system further includes an optical member placed to be removable and replaceable between said object and said objective lens, and said high-magnification objective optical system satisfies the following condition:

$0.2 < |NA \cdot m| < 1.2$ where NA is a numerical aperture of an optical system including said objective optical system and one of said pair of observation optical systems determined by $NA = n \sin u$ with n being a refractive index of a medium on an object side, and u being an angle, in said medium, formed between a center ray traveling along an optical axis of the observation optical system and an outermost ray, out of a bundle of rays that emerge from an object point on the center axis of said objective lens and that enter the observation optical system to form the image, and
m is a magnification of said objective lens.

13. A binocular stereomicroscope, comprising:
a high-magnification objective optical system including an objective lens; and a pair of observation optical systems that form light from an object into left and right images through said objective lens, each of said observation optical systems including an imaging lens and an eyepiece;

wherein said high-magnification objective optical system is constructed so that at least one lens unit of said objective lens is replaceable in accordance with said object and satisfies the following condition:

$$0.2 < |NA \cdot m| < 1.2$$

where NA is a numerical aperture of an optical system including said objective optical system and one of said pair of observation optical systems $$NA = n \sin u$$

with n being a refractive index of a medium on an object side, and u being an angle, in said medium, formed between a center ray traveling along an optical axis of the observation optical system and an outermost ray, out of a bundle of rays that emerge from an object point on the center axis of said objective lens and that enter the observation optical system to form the image, and m is a magnification of said objective lens.

14. A binocular stereomicroscope, comprising:

a high-magnification objective optical system including an objective lens; and a pair of observation optical systems that form light from an object into left and right images through said objective lens, each of said observation optical systems including an imaging lens and an eyepiece;

wherein said high-magnification objective optical system is constructed so that lens units of said objective lens are movable in a direction perpendicular to a specimen surface in accordance with said object and satisfies the following condition:

$$0.2 < |NA \cdot m| < 1.2$$

where NA is a numerical aperture of an optical system including said objective optical system and one of said pair of observation optical systems $$NA = n \sin u$$

with n being a refractive index of a medium on an object side, and u being an angle, in said medium, formed between a center ray traveling along all optical axis of the observation optical system and an outermost ray, out of a bundle of rays that emerge from an object point on the center axis of said objective lens and that enter the observation optical system to form the image, and m is a magnification of said objective lens.

* * * * *

UNITED STATES PATENT AND TRADEMARK OFFICE
CERTIFICATE OF CORRECTION

PATENT NO.    : 6,226,119 B1
DATED         : May 1, 2001
INVENTOR(S)   : Kurata

It is certified that error appears in the above-identified patent and that said Letters Patent is hereby corrected as shown below:

<u>Column 14,</u>
Lines 63-64, should read -- 7. A high-magnification objective optical system according to claim 6 wherein lens units of said objective lens are moveable in a direction perpendicular to a specimen surface. --

Signed and Sealed this

Twelfth Day of November, 2002

Attest:

Attesting Officer

JAMES E. ROGAN
*Director of the United States Patent and Trademark Office*